May 22, 1951 — P. I. COLE — 2,553,750
PACKING RING
Filed Dec. 26, 1946
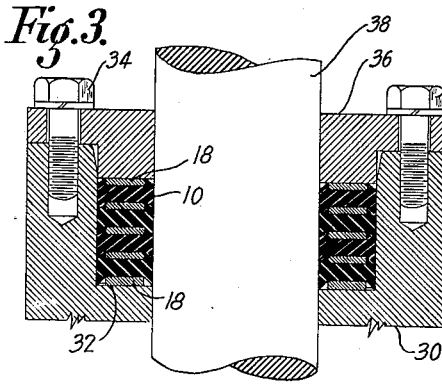
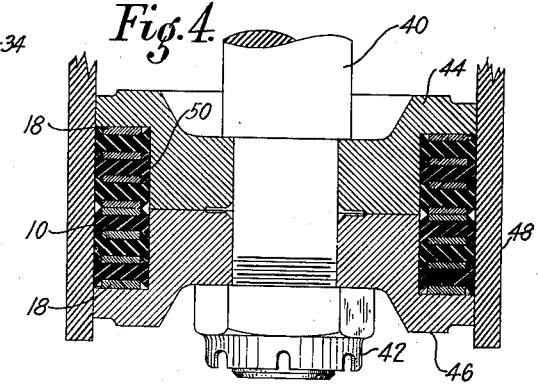
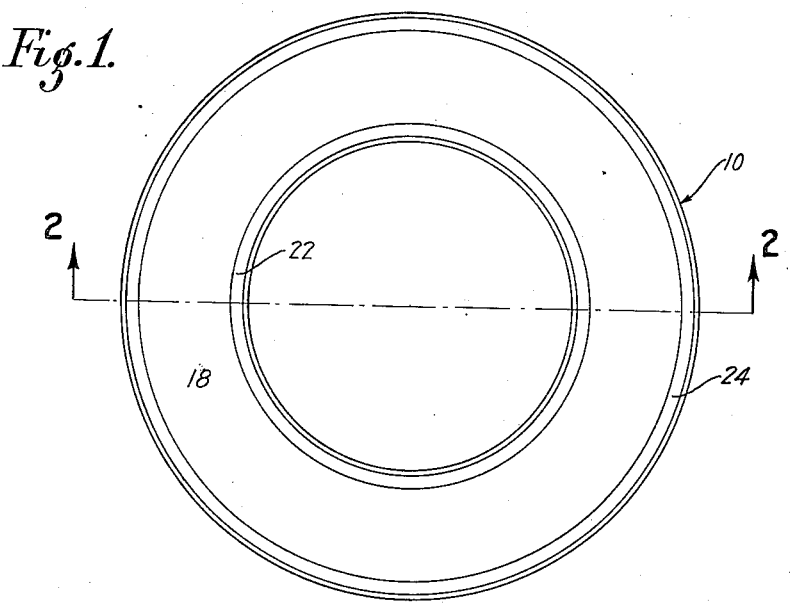
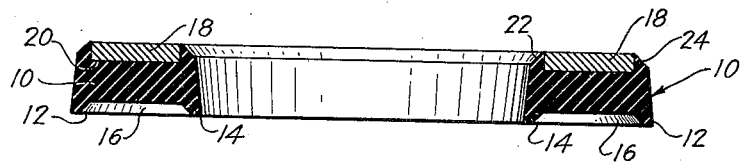
INVENTOR.
*Prentiss I. Cole*
BY
ATTORNEYS Patented May 22, 1951

2,553,750

UNITED STATES PATENT OFFICE 2,553,750

PACKING RING

Prentiss I. Cole, Palo Alto, Calif.

Application December 26, 1946, Serial No. 718,523

2 Claims. (Cl. 288—5)

This invention relates to fluid seals, and more particularly to a packing ring adapted for use with stuffing boxes, and the like.

One of the most widely used forms of packing rings is that termed a V packing, said packing being especially adapted for use as a piston head or piston rod stuffing box packing. It is conventional to employ a plurality of such packing rings in nested relation between male and female adapter rings located within a packing recess, and the adapter rings, due to the packings under either a pressurized hydraulic or pneumatic medium, are of necessity critically dimensioned and shaped. The adapter rings are also preferably made of a non-compressible material, and the preferred material is a metal dissimilar from the metal of the structure to be packed and having good bearing characteristics. A commonly used metal for this purpose is brass, which is relatively expensive.

An object of this invention is to provide an improved form of packing ring adapted for use in those installations normally embodying conventional V packing.

Another object of the invention is to provide a packing ring structure comprising an annular packing element having an individual adapter ring bonded thereto, said ring being so located with respect to the packing element that it enhances the flexibility of use of the packing structure, improves the nesting characteristics of a plurality of said structures, and enables a variable orientation of a plurality of packing rings in a particular installation.

Still another object of the invention is to provide a packing ring embodying a low cost, simply shaped, non-bearing metal adapter ring.

Other objects and advantages of the invention will be apparent from the following description when taken in conjunction with the drawing forming part of this specification, and in which:

Figure 1 is a plan view of the packing ring embodied in the invention;

Figure 2 is a view in section of the packing ring taken along lines 2—2 of Figure 1;

Figure 3 is a cross-sectional view of a particular application of the packing ring of the invention; and Figure 4 is a cross-sectional view of another application of the packing ring of the invention.

Referring to the drawing for more specific details of the invention, the packing ring 10 is comprised of an annular ring 11 of synthetic rubber having sealing lips 12 and 14 defining therebetween a channel 16. A steel washer or adapter ring 18 is bonded within a channel 20 in the opposite face of the ring, while the upper portion of the ring 10 adjacent the adapter ring 18 is bevelled at 22 and 24 to allow for the nesting of the adapter ring end of the packing within the channel 16 of an adjacent packing. The thickness of the adapter ring 18 is preferably greater than the depth of the channel 16, so that when a ring 18 is placed within the channel 16 of an endmost packing unit, as is shown in Figures 3 and 4, the sealing lips 12 and 14 will be free from engagement with the surface of the packing recess supporting said ring. Thus, a uniform adapter ring may be used for all applications of the packing.

Figure 3 illustrates an application of the packing rings to a piston rod. To a stuffing box or gland 30 having an annular recess 32 there is secured by bolts 34 a gland follower 36, while a piston rod 38 is journalled for reciprocation in the stuffing box. A plurality of nested packing rings 10 are disposed within the recess 32 with their sealing lips 12 and 14 directed toward the high pressure side of the stuffing box. The lowermost adapter ring 18, which is not necessarily bonded to the packing ring thereabove, abuts the stuffing box 30 so as to space the sealing lips 12 and 14 of the adjacent packing ring 10 from the surface of the stuffing box supporting said ring, while the uppermost adapter ring 18 is in pressing engagement with the face of the gland follower 36. If the recess 32 should be too deep for the number of packing rings shown, other adapter rings 18 may be added as shims at either end of the recess before the gland follower is secured to the stuffing box.

An application of the packing rings of the invention to a double acting piston is illustrated in Figure 4. A piston rod 40 is secured by a nut 42 to upper and lower portions 44 and 46 of a split piston head movable within a cylinder 48. Both portions of the piston head are cut away to provide a recess 50 within which a plurality of packing rings 10 are disposed. In order to obtain a double acting sealing action, the upper three packing rings are arranged in nested relation with their sealing lips disposed in one direction, while the lower three packing rings are arranged in nested relation with their sealing lips disposed in the opposite direction. The adapter rings 18 of the centrally disposed packing rings are in back to back engagement, and the uppermost and lowermost adapter rings are in engagement with the piston head portions 44 and 46, respectively.

When a plurality of packing rings are nested as shown in Figures 3 and 4, the adapter rings serve to preserve the alignment thereof by equalizing, due to their inflexibility, the transmission of force between adjacent packing rings, and, due to the fact that the adapter rings are lesser in width than the spacing between the sealing lips of the rubber rings to which they are bonded, the sealing lips are not backed up by an inflexible member to decrease their flexibility.

While the preferred embodiment of the invention has been shown and described, it is understood that the packing ring is subject to modification within the spirit of the invention and the scope of the appended claims.

What I claim as new and desire to secure by Letters Patent is:

1. A packing ring comprising an annular flexible ring, a channel in one face thereof, said channel having an inner planar surface of substantial width and bevelled side walls defining a pair of sealing lips, one lip being at the inner periphery and the other at the outer periphery of the flexible ring, a metal adapter ring embedded in the other face of the flexible ring having its outer surface conterminous with the face of the flexible ring, said adapter ring having a width equal to that of the inner surface of the channel, and bevelled edges on the flexible ring adjacent the adapter ring, terminating at the adapter ring and parallel and oppositely disposed to the bevelled sides of the channel.

2. A packing ring comprising an annular flexible ring having symmetrically tapered sides to provide opposite faces of varied width, a channel in the face of greatest width having an inner planar surface of substantial width and outwardly inclined side walls defining a pair of sealing lips, one lip being at the inner periphery and the other at the outer periphery of the flexible ring, a metal adapter ring embedded in the other face of the flexible ring having its outer surface conterminous with the face of the flexible ring, said adapter ring having a width equal to the width of the inner surface of the channel and less than the width of the face in which it is embedded, and bevelled edges on said other face of the flexible ring adjacent the adapter ring terminating at the adapter ring and parallel and oppositely disposed to the outwardly inclined side walls of the channel.

PRENTISS I. COLE.

REFERENCES CITED

The following references are of record in the file of this patent:

UNITED STATES PATENTS

| Number | Name | Date |
| --- | --- | --- |
| 1,968,650 | Mastin | July 31, 1934 |
| 2,144,682 | MacClatchie | Jan. 24, 1939 |
| 2,238,654 | Maier | Apr. 15, 1941 |
| 2,396,123 | Phillips | Mar. 5, 1946 |
| 2,440,015 | Meddick | Apr. 20, 1948 |

FOREIGN PATENTS

| Number | Country | Date |
| --- | --- | --- |
| 541,336 | Great Britain | 1941 |